UNITED STATES PATENT OFFICE.

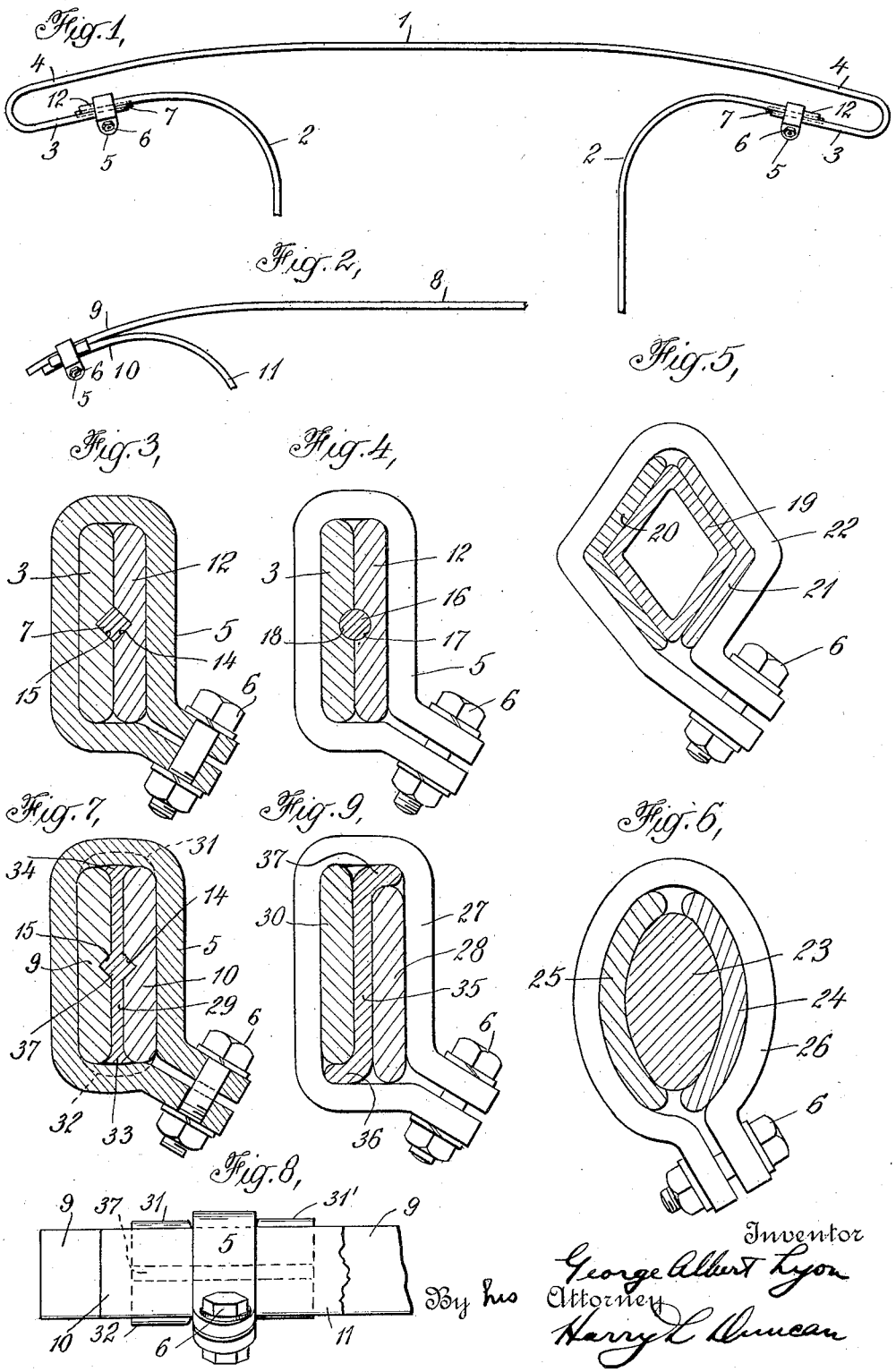

GEORGE ALBERT LYON, OF PHILADELPHIA, PENNSYLVANIA.

AUTOMOBILE BUMPER OR BUFFER DEVICE.

1,386,189. Specification of Letters Patent. Patented Aug. 2, 1921.

Application filed October 31, 1919, Serial No. 334,672. Renewed June 18, 1921. Serial No. 478,717.

*To all whom it may concern:*

Be it known that I, GEORGE ALBERT LYON, a citizen of the United States, and resident of Philadelphia, county of Philadelphia, and State of Pennsylvania, have made certain new and useful Inventions Relating to Automobile Bumpers or Buffer Devices, of which the following is a specification, taken in connection with the accompanying drawing.

This invention relates especially to automobile buffers which may advantageously have coöperating strips or members formed of tempered spring steel or other suitable resilient material and in which a buffer front member of spring strip may be united to spring strip attaching members by coöperating connector portions on these strips which are clamped together, resilient loops being formed on either the buffer front or attaching members to increase the resilient yield of the buffer, if desired. The coöperating connector portions of these members may be clamped or held together in connection with an interposed or intermediate connector alining member which may have internal or external flanges or projections to engage coöperating recesses or edges on the connector portions, so that they are more definitely and securely held in alined position in connection with the clamping devices employed. These connector alining members which are of course preferably of such size and shape as to fit between the coöperating connector portions of the buffer members, may have special internal or concealed alining portions or projections which may be in the form of angular or circular sectioned ribs or portions of the buffer members so as to hold the parts in definite vertical alinement when the substantially flat or thin strips are forced together.

In the accompanying drawings showing in a somewhat diagrammatic way a number of illustrative embodiments of this invention, Figure 1 is a top view showing a form of buffer.

Fig. 2 is a partial top view showing another buffer construction.

Fig. 3 is an enlarged transverse section taken through the coöperating connector portions of the buffer members.

Figs. 4, 5, 6, 7, and 9 are corresponding sectional views showing in a more or less diagrammatic way other forms of connector alining members and the coöperating clamping devices and buffer members; and Fig. 8 is a front view of the form of device shown in Fig. 7.

The resilient buffer front member may as shown in Fig. 1 consist of a single resilient strip of tempered spring steel, for example, of which the portion 1 is adapted to extend across the front of the automobile or other vehicle, and if desired resilient end loops may be formed on one of the coöperating buffer members as by forming the buffer front with inturned connector portions 3 which are preferably substantially straight and approximately parallel to the adjacent front portions 4 of this buffer member, so that a considerable connector or adjusting portion is formed adjacent the ends 7 of this member. Attaching members, such as 2, which may with advantage be formed of similar spring steel strip may have their ends of such form and construction as to be conveniently and securely connected to the vehicle frame and the outwardly extending connector portions 12 of these attaching members may be substantially straight adjacent their ends so as to properly coöperate with the adjacent connector portions of the buffer front and be clamped or secured thereto in adjusted position by any suitable means, such as the clamping devices 5 which may inclose these connector members and be formed with a bolt 6 and lock washers to force together the ends of each clamping device which preferably extend in a somewhat diagonal direction as is indicated in Fig. 3.

It is of considerable advantage in order to promote the vertical alinement of these coöperating connector portions especially where only a single relatively narrow clamping device is used as where the extent of overlap of these connector portions is relatively short to use in connection therewith an interposed connector alining member of any suitable form and construction to substantially grip or engage these connector portions and preferably have a wedging alining action in connection therewith, so that when clamped together the connector portions are definitely forced into and retained in their substantially alined position so that vertical displacement or lack of alinement cannot take place even under the continued shaking and vibration of automobile service. For this purpose the entire spring steel or other buffer strips or at least their connector portions may be originally rolled or otherwise formed with alining recesses or continuous channels such as the angular grooves or channels 14, 15 shown in Fig. 3 in the coöperating connector portions of these spring strip members 3, 12. An angular interposed connector alining member 7 having substantially coöperating angular cross-section and preferably formed of relatively soft steel or other suitable material which should of course have ample strength to resist shearing action, is arranged within these channels before the clamping device is tightened, so that when the screw 6 tightens the clamping device and forces the adjacent faces of these connector portions together the alining member is forced strongly and accurately into the recesses or channels in these connector portions so as to insure their proper vertical alinement in which they are retained as long as the clamp remains tight. The alining member when of this internal or concealed strip form preferably has a length of at least three or four inches and where the natural irregularities of these channels and strips are not sufficient to secure amply strong gripping engagement to prevent slipping under service conditions, the strip alining member or preferably the faces of these channels or recesses may be formed with irregularities or projections as by peening or forcing out sharp burs or other portions of the edges of these channels in the spring steel strips, for example, so that they force or nick their way into the alining member and definitely prevent its endwise slip after the clamping device has been tightened. It is usually sufficient, however, to rely on the natural irregularities of these grooves and substantially square strip alining members; although in some cases it is desirable to have the alining strip of greater length than the coöperating connector portions as is indicated in Fig. 1. Fig. 4 shows a somewhat similar interposed and concealed internal alining member 16 which is indicated as having a substantially circular cross-section and a cylindrical rod or strip of mild steel, for example, may be used in this way in connection with semicircular channels or recesses 17, 18 in the connector portions of the buffer members which preferably fit quite tightly around the alining rod or member so as to effect the secure vertical alinement of the parts after the clamping device has been tightened as by screwing up the bolt 6. It is of course understood that in this cylindrical or rod form of alining member it is preferable in some cases to form the channels in the coöperating spring strips with slightly increased depth beyond an exact semi-circular form, so that in such cases the lateral alinement of the parts is insured by tight engagement between the rod alining member and the lateral edges of these channels before the rod engages the bottoms of the channels to prevent the connector portions being forced into close or firm engagement with each other.

Fig. 5 shows another form of interposed connector alining member 19 which as indicated may be a hollow tubular member of steel or other suitable material of such shape as to properly fit within and coöperate with the grooved sectioned buffer members 20, 21. The clamping device 22 is in this instance given a special angular or generally diamond shaped form so as to closely embrace these coöperating portions of the buffer members and interposed connector alining member and by tightening the clamping screw 6, for instance, the parts are securely connected and simultaneously held in vertical alinement in an obvious way. Fig. 6 shows a somewhat similar interposed alining member 23 which may as indicated be of solid rod or bar construction of such cross-section as to fit within and have valuable alining action on the curved section connector portions 24, 25 of the coöperating buffer members. The clamping device 26 is given a corresponding form to hold these parts together at any suitable part of the buffer where these spring steel or other strip members may be connected for adjustment or otherwise.

Another illustrative arrangement showing a way in which interposed alining members of these general types may be employed in automobile or other vehicle buffers is shown in Fig. 2 as comprising the buffer front member 8 having a slightly rearwardly curved or extending connector portion 9 at each end while the coöperating attaching member 11 may have a substantially straight or adjusting portion 10 coöperating with the connector portions 9 at each end of the buffer front. A similar clamp 5 may be used to inclose these parts and force them tightly together and simultanously maintain their desired vertical alinement in connection with any suitable form of interposed connector aliner member such as 31 which is illustrated more in detail in Figs. 7 and 8. As shown in Fig. 7, the interposed connector alining member 29 may be formed with external alining flanges such as 33, 34, which may more or less extend beyond or embrace the usual rounded edges of these spring strip members, such as 9, 10, and in some cases additional or enlarged section alining flanges or joint concealing portions 31, 32, may be used preferably beyond the clamping member 5 so that in this way the clamp positively holds the alining member in longitudinal position, so that it cannot slip out even though the clamp becomes somewhat loose. It is sometimes advantageous to form such an alining member with integral or other internal or concealed alining projections or members, such as 37, which may, if desired, be in the form of angular projections on each side of the relatively thin interposed alining member so as to fit into angular grooves or channels 14, 15 in the adjacent faces of the two connector portions of the buffer members. In this way additional alining action is secured and it is not of course necessary under such conditions to have the external or joint concealing alining flanges 31, 32 above referred to. Fig. 8 shows this arrangement and indicates the way in which these joint concealing portions 31, 32 may extend on one side of the clamping device 5 while a similar projecting portion 31' is preferably arranged on the upper edge of the alining member beyond the clamp 5. The clamp and alining member may thus be brought into proper relative position and slipped over one of the coöperating connector portions and then the other connector portion or strip end may be slipped into place and adjusted in position before the clamp is tightened to definitely hold the parts together and insure their vertical alinement.

Fig. 9 shows still another illustrative arrangement in which the interposed connector alining member 35 is formed with alternately arranged alining flanges 36, 37, one of which may extend laterally across the top of one of the connector portions 30 of a buffer member while the other flange 36 may extend below the bottom of the coöperating spring strip or other buffer member 28. The clamping device 27 is so arranged as to inclose all of these parts and when tightened as by the clamping bolt 6 the connector portions of the buffer strips are tightened and their edges simultaneously forced into engagement with the interposed alining member so that the vertical alinement of the strips is thus promoted and insured.

This invention has been described in connection with a number of embodiments, forms, proportions, parts, arrangements, materials, methods of manufacture, connection and use, to the details of which disclosure the invention is not of course to be limited, since what is claimed as new and what is desired to be secured by Letters Patent is set forth in the appended claims:

1. The automobile buffer comprising a resilient strip buffer front member having grooved connector portions and spring strip attaching members having grooved connector portions coöperatitng with the connector portions of said buffer front member, interposed connector alining members arranged between each of said coöperating connector portions and comprising a concealed angular sectioned connector member fitting within the angular grooves in said connector portions and comprising external alining flanges engaging the edges of said connector portions to promote the vertical alinement thereof, and clamping devices substantially embracing said connector portions and alining members to strongly and reliably hold said buffer members in adjusted position.

2. The automobile buffer comprising a resilient strip buffer front member having grooved connector portions and attaching members having grooved connector portions coöperating with the connector portions of said buffer front member, interposed connector alining members arranged between each of said coöperating connector portions and comprising a connector member fitting within the grooves in said connector portions and comprising external alining flanges engaging the edges of said connector portions to promote the vertical alinement thereof, and clamping devices substantially embracing said connector portions and alining members to strongly and reliably hold said buffer members in adjusted position.

3. The automobile buffer comprising a resilient strip front member having a connector portion formed with an alining groove, a coöperating connector portion having a corresponding alining groove, an interposed connector alining member arranged between said connector portions and comprising an angular sectional integral alining member to engage said grooves and comprising external alining flanges to engage the edges of said connector portions and clamping means substantially embracing said connector portions and said alining member to force them together and hold said connector portions in adjusted position.

4. The automobile buffer comprising a member having a connector portion formed with an alining groove, a coöperating connector portion having a corresponding alining groove, an interposed connector alining member arranged between said connector portions and comprising an internal alining member to engage said grooves and comprising external alining flanges to engage the edges of said connector portions and clamping means substantially embracing said connector portions and said alining member to force them together.

5. The automobile buffer comprising a member having a connector portion formed with an alining groove, a coöperating connector portion having an alining groove, an interposed connector alining member arranged between said connector portions and comprising an internal alining member to engage said grooves and comprising external alining projections to engage the edges of said connector portions and clamping means to force said connector portions and said alining member together.

6. The vehicle buffer comprising a resilient strip front member having a connector portion, a coöperating connector portion, an interposed connector alining member arranged between said connector portions and comprising external alining flanges to engage the edges of said connector portions and clamping means substantially embracing said connector portions and the interposed alining members to force them together and hold the coöperating connector portions in adjusted position.

7. The vehicle buffer comprising a member having a connector portion, a coöperating connector portion, an interposed connector alining member arranged between said connector portions and comprising projections to engage the edges of said connector portions at separated points longitudinally of said connector portions and clamping means substantially embracing said connector portions and the interposed alining members to force them together and hold the coöperating connector portions in position.

8. The vehicle buffer comprising a member having a connector portion, a coöperating connector portion, an interposed connector alining member arranged between said connector portions and comprising projections to interlock with said connector portions at separated points longitudinally of said connector portions and clamping means to hold together said connector portions and the interposed alining members and hold the coöperating connector portions in position.

9. The automobile buffer comprising a resilient strip front member having a connector portion formed with an alining groove, a coöperating connector portion formed with a corresponding alining groove, an interposed connector alining member arranged between said connector portions and comprising an angular sectioned internal alining member to engage said grooves and clamping means substantially embracing said connector portions and said alining member to force them together and hold said connector portions in adjusted position.

10. The automobile buffer comprising a member having a connector portion formed with an alining groove, a coöperating connector portion formed with a corresponding alining groove, an interposed connector alining member arranged between said connector portions and comprising an internal alining member to engage said grooves and clamping means substantially embracing said connector portions and said alining member to force them together and hold said connector portions in position.

11. The automobile buffer comprising a member having a connector portion formed with an alining groove, a coöperating connector portion formed with a corresponding alining groove, an interposed connector alining member arranged between said connector portions and comprising an internal alining member to engage said grooves at separated points longitudinally of said connector portions and clamping means substantially embracing said connector portions and said alining member to force them together and hold said connector portions in position.

12. The automobile buffer comprising a member having a substantially flat strip connector portion formed with an alining recess, a coöperating substantially flat strip connector portion formed with a corresponding alining recess, an interposed connector alining member arranged between said overlapping connector portions and comprising an internal alining member to engage said recesses at points longitudinally separated along said connector portions and comprising external alining projections engaging the edges of said connector portions to promote vertical alinement thereof and devices to force together the substantially flat coöperating faces of said connector portions and the interposed alining member.

13. The automobile buffer comprising a member having a substantially flat strip connector portion formed with an alining recess, a coöperating substantially flat strip connector portion formed with a corresponding alining recess, an interposed connector alining member arranged between said overlapping connector portions and comprising an internal alining member of greater length than said overlapping connector portions to engage said recesses at points longitudinally separated along said connector portions to promote vertical alinement thereof and devices to force together the coöperating faces of said connector portions and the interposed alining member.

14. The automobile buffer comprising a resilient front member having a substantially flat strip connector portion, a coöperating substantially flat strip connector portion, an interposed connector alining member arranged between said connector portions and comprising external alining flanges engaging at longitudinally separated points the edges of said connector portions to promote vertical alinement thereof and clamping devices to force together the substantially flat coöperating faces of said connector portions and the interposed alining member.

15. The automobile buffer comprising a member having a substantially flat strip connector portion, a coöperating substantially flat strip connector portion, an interposed connector alining member arranged between said connector portions and comprising alining projections engaging the edges of said connector portions to promote vertical alinement thereof and means to force together the coöperating faces of said connector portions and the interposed alining member.

16. The automobile buffer comprising a resilient member having a substantially flat strip connector portion, a coöperating substantially flat strip connector portion, an interposed connector alining member arranged between said connector portions, said alining member and connector portions comprising alining projections and coöperating recessed portions to be interlockingly engaged by said projections at points longitudinally separated along said connector portions to promote vertical alinement thereof and clamping devices to force toward each other the coöperating faces of said connector portions and the interposed alining member.

17. The automobile buffer comprising a resilient member having a connector portion, a coöperating connector portion, an interposed connector alining member arranged between said connector portions, said alining member and connector portions comprising alining projections and coöperating portions to be interlockingly engaged by said projections at points longitudinally separated along said connector portions to promote vertical alinement thereof and clamping devices to force toward each other the coöperating faces of said connector portions and the interposed alining member.

18. The automobile buffer comprising a member having a connector portion, a coöperating connector portion, an interposed connector alining member arranged between said connector portions, said alining member and connector portions comprising alining projections and coöperating portions to be engaged by said projections to promote vertical alinement of said connector portions and clamping devices to force toward each other the coöperating faces of said connector portions and the interposed alining member.

GEORGE ALBERT LYON.